United States Patent [19]

Baumann et al.

[11] 4,346,426
[45] Aug. 24, 1982

[54] MAGNETIC TAPE DE-GAUSSER AND METHOD OF ERASING MAGNETIC RECORDING TAPE

[75] Inventors: John S. Baumann, Fullerton; Roger W. Knipp, Fountain Valley; Joseph J. Kacin, Huntington Beach, all of Calif.

[73] Assignee: Fluxcom, Inc., Anaheim, Calif.

[21] Appl. No.: 223,142

[22] Filed: Jan. 7, 1981

[51] Int. Cl.³ ............................................. H01F 13/00
[52] U.S. Cl. .................................................. 361/151
[58] Field of Search ................. 361/149, 151; 335/284

[56] References Cited

U.S. PATENT DOCUMENTS

| | | |
|---|---|---|
| 2,730,570 | 1/1956 | Rettinger . |
| 2,733,300 | 1/1956 | Menard . |
| 2,826,643 | 3/1958 | Greiner . |
| 2,848,660 | 8/1958 | Boyers . |
| 3,023,280 | 2/1962 | Tronslin et al. ................ 361/151 |
| 3,133,160 | 5/1964 | Catto . |
| 3,329,872 | 7/1967 | Amos . |
| 3,428,867 | 2/1969 | Becker . |
| 3,478,177 | 11/1969 | Morita . |
| 3,548,113 | 12/1970 | Althuber . |
| 3,660,727 | 5/1972 | Ohria et al. . |
| 3,879,754 | 4/1975 | Ballinger . |

*Primary Examiner*—Harry E. Moose, Jr.
*Attorney, Agent, or Firm*—Knobbe, Martens, Olson, Hubbard & Bear

[57] ABSTRACT

A magnetic tape de-gausser includes a pair of electromagnets which are arranged to project a magnetic field through a magnetic tape reel to magnetically erase the magnetic tape. The electromagnets are mounted to be movable so as to tightly accomodate various size tape reels between the electromagnets. Structures are provided to control the separation between the electromagnets, to prevent a tape reel from destructively contacting an electromagnet, and to control the movement of a tape reel in rotation towards and away from electromagnets.

23 Claims, 12 Drawing Figures

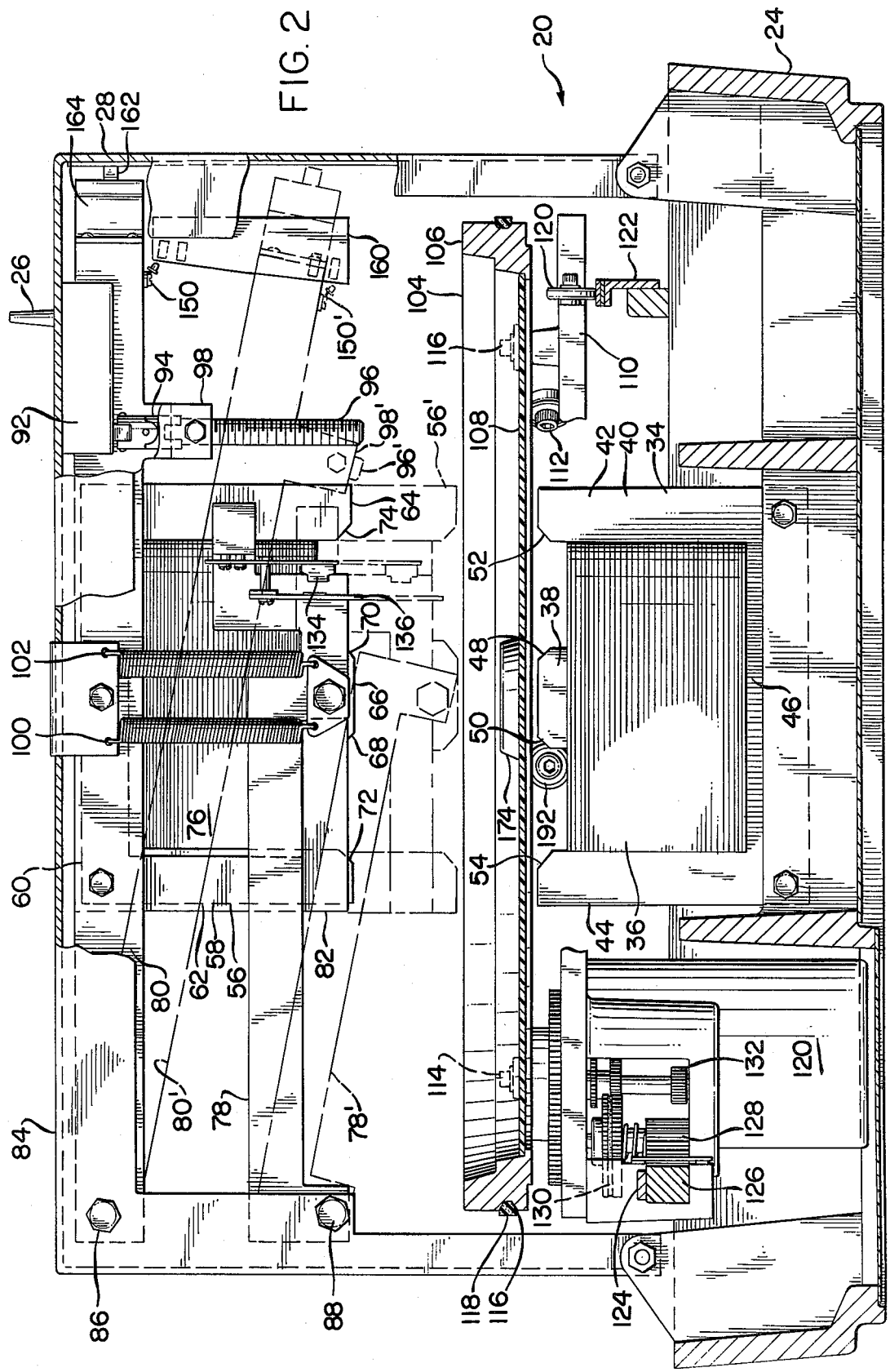

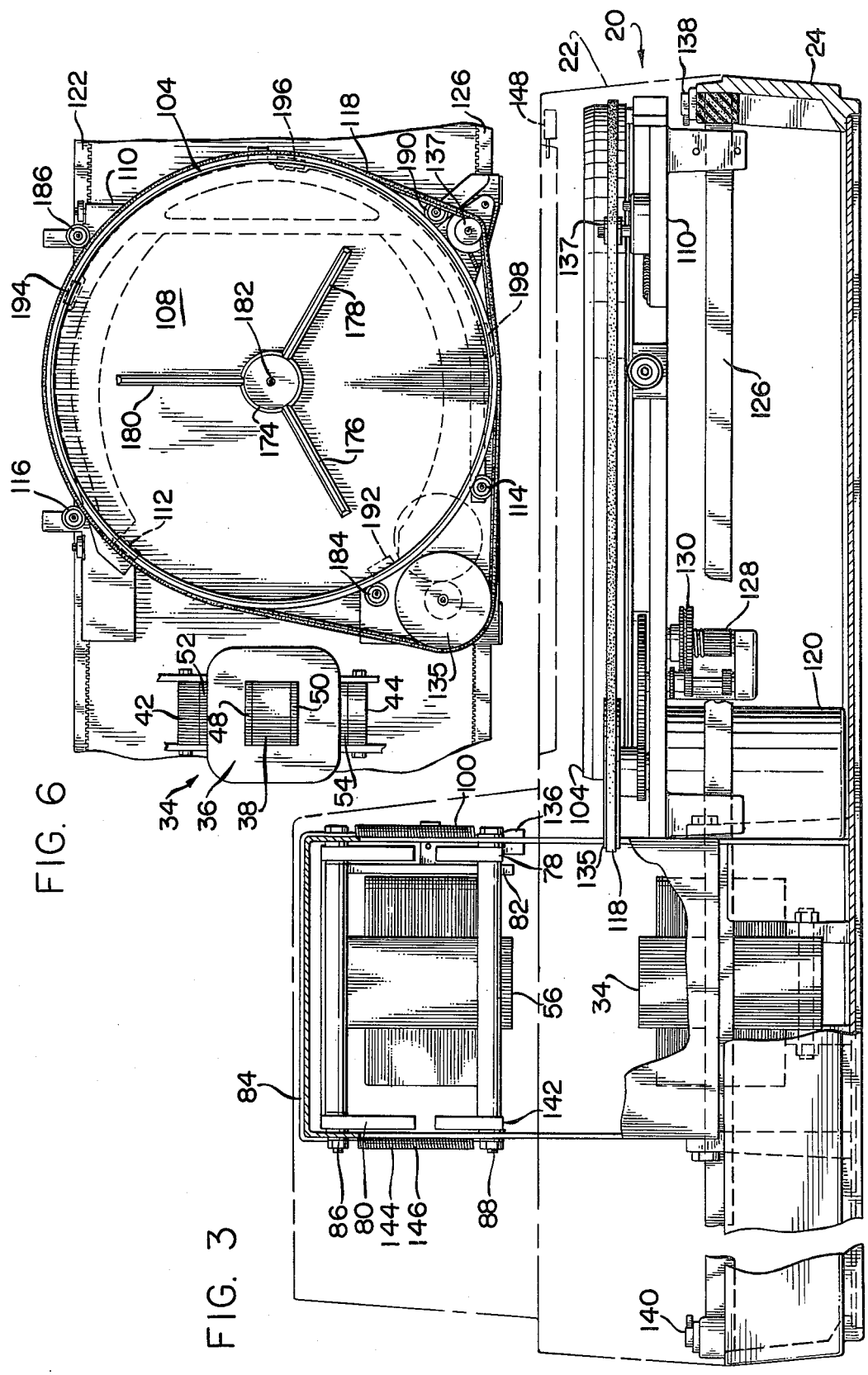

MAGNETIC TAPE DE-GAUSSER AND METHOD OF ERASING MAGNETIC RECORDING TAPE

BACKGROUND OF THE INVENTION

This invention relates generally to electrical devices for de-gaussing or erasing magnetic recording tapes and pertains more particularly to such systems using electromagnets and structures to move the tape with respect to the electromagnets.

Many types of devices are known in the prior art for erasing magnetic recording tapes. One example is U.S. Pat. No. 2,826,643 to Bruce Greiner, which discloses a method of erasing magnetic tapes by placing the tape between two demagnetizing coils, which are connected in parallel. That patent discloses the use of a threaded rod having a handwheel for moving the two coils towards and away from each other in order to accomodate recording tape of differing widths. That patent also discloses the use of a motor in combination with a roller for use in rotating a magnetic tape roll by contacting the roll on its outer circumference.

Another example of a prior art tape de-gausser is Rettinger U.S. Pat. No. 2,730,570 which shows the use of a pair of oppositely mounted "E" shaped magnetic cores for erasing a length of magnetic tape. From FIG. 2 of that patent, it appears that the sections of the magnetic cores have slightly narrowed tips.

The major purpose of bulk magnetic tape eraser or degausser machines is to effectively remove information which has been magnetically encoded onto magnetically sensitive tape which is stored on reels, cassettes, or some other form of cartridge or container. It is desireable that such tape may be erased quickly in bulk, while it is still on the reel or cartridge in which it is normally stored. For example, it is desireable that reels of magnetic video tape for television use can be quickly erased and reused to record new video signals without encountering any latent remains of previously recorded video signals. Such tape erasers are valuable for use in erasing video tapes, audio tapes, and computer tapes.

It is desireable that magnetic tape erasers be capable of erasing tapes stored on the large variety of reels, cassettes, and cannisters which are in commercial use without removing the tape from its container. It is also desireable that magnetic tape erasers be capable of adequately and fully erasing modern high-coercivity tapes made using chromium or other metals. Because of higher recent performance standards for magnetic recording tapes, it is important that magnetic tape erasers make as complete as possible an erasure of information encoded on a tape so as to prevent remnant information of prior recordings from contaminating later recordings.

A problem with prior art tape erasers is their inability to efficiently, effectively, and quickly erase high coercivity magnetic recording tapes. Another problem with prior art tape erasers is their inability to accurately, easily, reliably, and quickly adjust to accomodate different sizes and shapes of magnetic tape containers. A further problem with prior art tape erasers is their requirement of manual operator efforts in the tape erasing process.

SUMMARY OF THE INVENTION

Accordingly, it is an object of this invention to provide a bulk magnetic recording tape de-gausser or eraser for erasing information magnetically encoded on recording tapes.

This invention involves a magnetic tape erasing system which includes a pair of electromagnets mounted one above the other with the upper electromagnet being manually, vertically adjustable with respect to the lower electromagnet so as to provide adequate clearance for and a tight fit for various sizes of magnetic tape containers. The electromagnets are "E" shaped and have vertically opposing polarity pole pieces with notched ends to promote a strong vertical magnetic erasing field flux. The electromagnet winding coils are electrically connected in parallel with capacitors to form tuned inductance - capacitance tank circuits resonant at the power line frequency to provide a large magnetic erasing field flux without undue power drain or large voltage requirements. A rotating tape tray is provided for supporting the tape to be erased and for conveying the tape towards and away from between the electromagnets. A tape height sensor is provided to restrict the lateral movement of the tape when the separation between the electromagnets is not adequate and thus to prevent physical damage to the tape and to the tape eraser machine itself. A standard magnet separation system is provided to allow the separation between the electromagnets to be easily and repeatably set to distances appropriate for standard tape reels or cannisters.

Another feature of this invention is a rotating circular tape tray having a small thickness so that minimal separation results between the tape to be erased and the erasing electromagnets.

A further feature of this invention is a tray rotation and translation control circuit for controlling the motion of the tape tray and the magnetic tape to be erased so that effective and uniform erasure of the magnetic tape results.

Another feature of this invention is a parallelogram linkage supporting the upper electromagnet and having a manually adjustable crank to allow adjustment of the vertical position of the upper electromagnet.

Another feature of this invention is an electromagnet drive circuit for electrically exciting the electromagnets at preselected and manually adjustable power levels. The electromagnets are excited to be electrically out of vertical phase so as to create a strong vertically oriented magnetic flux between the electromagnets. The electromagnets have windings which are electrically driven from center taps so as to minimize the excitation voltage level required to drive the electromagnets. The electromagnet coils are connected in resonant tank circuits with capacitors to minimize the power required to drive the electromagnets and to allow the electromagnets to "ring" in a damped oscillation when the drive power is discontinued so as to promote uniform, efficient tape erasure.

A further feature of this invention is a safeguard timer circuit to shut down operation of the magnetic tape de-gausser if too much time elapses during the tape erasing operating cycle as when a tape reel becomes physically stuck between the electromagnets or when the magnetic tape de-gausser malfunctions.

Another feature of this invention is an electromagnet overheating prevention circuit which includes a temperature sensor on the electromagnets and means for preventing the start of a tape erasing operating cycle when the danger of the electromagnets overheating exists.

These and other advantages of this invention will appear more fully from the following description made in conjunction with with accompanying drawings wherein like reference characters refer to the same or similar parts throughout the several views.

DESCRIPTION OF THE DRAWINGS

FIG. 2 is a partially cut-away sectional view of the magnetic tape de-gausser of FIG. 1 taken along the line 2—2 thereof and showing, in phantom, a lowered position of the upper electromagnet and parallelogram linkage.

FIG. 3 is a partially cut-away sectional view of the magnetic tape de-gausser of FIG. 1 taken along the line 3—3 thereof and showing, in phantom, the cover shroud and tape tray cover.

FIG. 6 is a partially cut-away top sectional view of a portion of the magnetic tape de-gausser of FIG. 1 taken along the line 6—6 thereof.

DESCRIPTION OF THE PREFERRED EMBODIMENT

Figure 1:
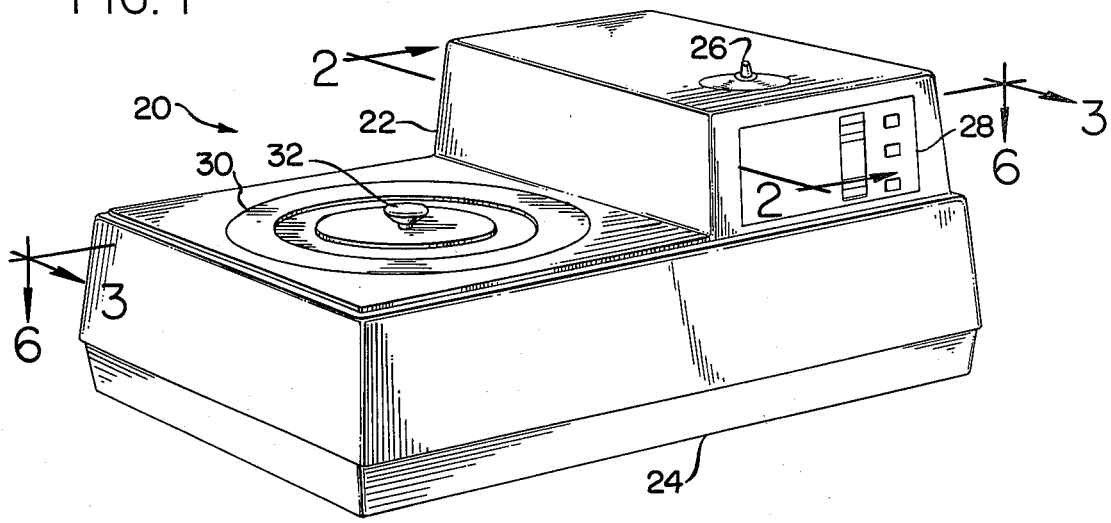
FIG. 1 is a front perspective view of the magnetic tape de-gausser of this invention.

Referring first to FIG. 1, the magnetic tape de-gausser 20 has a top cover shroud 22 mounted on a base plate casting 24. A manually rotatable crank knob 26 projects from the cover shroud 22 to allow the user of the de-gausser 20 to manually make adjustments to accommodate various physical thicknesses and sizes of magnetic recording tape and tape reels or containers.

A display panel 28 is mounted on the front of de-gausser 20 and has indicators to display the physical and electrical status of de-gausser 20 and has control switches mounted thereon to control the operation of de-gausser 20. It is preferable that display panel 28 comprise a translucent sheet of plastic material which allows indicator lights to shine therethrough and which may be readily labeled with printed text which becomes visible when light is projected through panel 28.

Removable tape tray cover 30 fits onto cover shroud 22 and provides access to the inside of degausser 20 for the insertion of magnetic recording tapes to be erased. Tape tray cover 30 is a generally circular disk having a cover knob 32 allowing the cover 30 to be easily manually lifted by the user of de-gausser 20.

Referring next to FIG. 2, lower electromagnet 34 is securely attached to and mounted on base plate casting 24. Electromagnet 34 has a wire coil winding 36 wound around a center pole piece 38 of an "E" shaped electromagnet core 40. Electromagnet core 40 is composed of interleaved laminations of standard, commercially available, iron transformer core material of the type customarily used in fabricating choke and transformer cores and the like. Electromagnet core 40 has edge pole pieces 42 and 44 which are mounted on opposite sides of electromagnet 34 on the periphery of coil 36 and are mounted parallel to center pole piece 38. Pole pieces 38, 42, and 44 project vertically upwards from horizontal core piece 46 which mechanically and magnetically connects pole pieces 38, 42, and 44 and which is a part of electromagnet core 40.

Center pole piece 38 has notches 48 and 50 cut in the upper, side edges thereof. Similarly, edge pole piece 42 has a notch 52 placed in the upper, side edge thereof which faces center pole piece 38. Notches 48 and 52 are placed in pole pieces 38 and 42, respectively, as inwardly sloping beveled or rounded edges which face each other so as to increase the magnetic impedance and reduce the magnetic coupling between pole pieces 38 and 42; thus reducing the horizontal magnetic flux between pole pieces 38 and 42 when lower electromagnet 34 is in operation. Notches 48 and 52 also serve to increase the vertical magnetic flux from lower electromagnet 34 and serve to increase the magnetic field strength in the upper ends of pole pieces 38 and 42. Notches 48 and 52 thus act to concentrate the vertical magnetic flux and act to inhibit horizontal magnetic flux from lower electromagnet 34. Notches 48 and 52 accomplish such results by reducing the horizontal surface area of the ends of pole pieces 38 and 42 and by reducing the amount of metal in the horizontal path between the ends of pole pieces 38 and 42 so as to increase the magnetic impedance therebetween. Notches 48 and 52 promote the effective and efficient erasing of recording tape by magnetic tape degausser 20 by encouraging a large and high intensity vertical magnetic flux.

Edge pole piece 44 has a notch 54 placed in the upper, side edge thereof which faces center pole piece 38. Notches 50 and 54 are placed in pole pieces 38 and 44, respectively, as inwardly sloping beveled or rounded edges which face each other so as to co-act and cooperate with each other in substantially the same way as notches 48 and 52 function, as described above. Notches 50 and 54 serve to further increase the vertical magnetic flux and also serve to increase the magnetic field intensity at the upper ends of pole pieces 38 and 44.

Upper electromagnet 56 is substantially identical in construction to lower electromagnet 34 and has an "E" shaped electromagnet core 58 with a core piece 60 mounted horizontally, and edge pole pieces 62 and 64 and center pole piece 66 projecting vertically downwards from core piece 60. Center pole piece 66 has notches 68 and 70 placed therein. Edge pole pieces 62 and 64 have notches 72 and 74, respectively, placed therein. Notches 72, 68, 70, and 74 serve the same purposes, functions, and objectives as described above with reference to notches 54, 50, 48, and 52.

Center pole piece 66 is in approximate vertical alignment with center pole piece 38 and wire coil winding 76 is wound on center pole piece 66 to provide a magnetic field in phase with the magnetic field generated by coil winding 36. Windings 36 and 76 cause center pole pieces 38 and 66 to be at opposite magnetic polaritys so that magnetic flux is promoted vertically between center pole pieces 38 and 66 and so that a vertically directed magnetic field results between electromagnets 34 and 56. The "E" shaped electromagnet core 40 causes edge pole pieces 42 and 44 to have a magnetic polarity(-North or South polarity) which is opposite to the magnetic polarity of center pole piece 38. Since the center pole piece 38 is at opposite magnetic polarity to the edge pole pieces 42 and 44, there is some tendency for magnetic flux to flow between the center pole piece 38 and the edge pole pieces 42 and 44; and this tendency is resisted by notches 54, 50, 48, and 52.

The "E" shaped electromagnet core 58 causes edge pole pieces 62 and 64 to have a magnetic polarity which is opposite to the magnetic polarity of center pole piece 66. Since the center pole piece 66 is at an opposite magnetic polarity to the edge pole pieces 62 and 64, there is some tendency for magnetic flux to flow between the center pole piece 66 and the edge pole pieces 62 and 64; and this tendency is resisted by notches 72, 68, 70, and 74. Thus, edge pole pieces 44 and 62 are at opposite magnetic polaritys so that magnetic flux is promoted vertically between pole pieces 44 and 62 and so that a vertically directed magnetic field results between electromagnets 34 and 56. Also, edge pole pieces 42 and 64 are at opposite magnetic polaritys so that magnetic flux is promoted vertically between pole pieces 42 and 64 and so that a vertically directed magnetic field results between electromagnets 34 and 56. Therefore, the magnetic flux flow direction and magnetic field direction between center pole pieces 38 and 66 are opposite to the magnetic flux flow direction and magnetic field direction between the pairs of edge pole pieces 44 and 62, and 42 and 64.

Upper electromagnet 56 is mechanically suspended from a parallelogram linkage consisting of link 78 and link frame 80 which are pivotably bolted to upper electromagnet 56 through a "G" shaped support bracket 82 which is securely mounted on upper electromagnet 56. Link 78 and link frame 80 are pivotably bolted to upper housing 84 by means of bolts 88 and 86, respectively. Upper housing 84 is securely mounted on base plate casting 24. Link 78 is pivotably bolted to support bracket 82 by means of bolt 90. The distance between bolts 88 and 90 is the same as the distance between bolt 86 and a bolt (not shown) pivotably connecting link frame 80 with support bracket 82. Thus, link 78 and link frame 80 form a parallelogram linkage allowing upper electromagnet 56 to be moved upwards and downwards vertically with respect to base plate casting 24, and further insuring that upper electromagnet 56 remains upright and is prevented from tilting as it is moved up and down. It is important that upper electromagnet 56 be prevented from tilting so that the lower surface of upper electromagnet 56 defined by the lower ends of pole pieces 64, 66, and 62 remains horizontal thus allowing a magnetic tape (not shown) to be erased to closely approach the lower surface of upper electromagnet 56. Manually rotatable crank knob 26 is connected through a gear box 92, a universal joint 94, and a leadscrew 96 to a threaded connector 98 on link frame 80. As leadscrew 96 is rotated, link frame 80 is vertically moved by threaded connector 98 since knob 26, gearbox 92, universal joint 94, and leadscrew 96 are supported by upper housing 84. Universal joint 94 allows leadscrew 96 to swing vertically to accomodate the horizontal motion of threaded connector 98 as link frame 80 is vertically moved. Rotation of crank knob 26 causes the activation of gearbox 92, rotation of universal joint 94, rotation of leadscrew 96 which is engaged with threaded connector 98, and vertical movement of link frame 80. Thus, link frame 80 and upper electromagnet 56 may be moved vertically upwards and downwards by a user of magnetic tape degausser 20 who manually rotates crank knob 26. The mechanical advantage provided by leadscrew 96 allows upper electromagnet 56 to be precisely positioned in a stable vertical position determined by the user of magnetic tape degausser 20. Upper electromagnet 56 is shown in phantom in a vertically lowered position as 56'. Similarly, link 78 and link frame 80 are shown in phantom as 78' and 80' corresponding to their position relative to upper electromagnet 56'. When the upper electromagnet 56 is lowered to the position 56', the leadscrew 96 pivots to 96' to accomodate the horizontal translation of the threaded connector 98 which moves to 98'. Note that upper electromagnet 56 does not become tilted as it moves from 56 to 56' but vertically lowers and shifts slightly horizontally.

A pair of helical coil springs 100 and 102 are mounted between bolt 90 and upper housing 84 to counterbalance the weight of upper electromagnet 56 and allow rotation of crank knob 26 without undue manual effort.

Rotatable circular tape tray 104 has a circular metallic ring-like rim 106 placed around the periphery of a thin, non-metallic bottom disk 108 which is preferably composed of the type of fiberglass reinforced sheet material typically used for the commercial fabrication of printed circuit boards. Disk 108 is preferably thin and preferably does not impede magnetic fields so that a recording tape (not shown) to be erased which is placed on disk 108 may be readily magnetically erased by electromagnets 34 and 56. Rim 106 vertically supports disk 108 and allows disk 108 to be rotated and moved horizontally. Tape tray 104 holds the recording tape (not shown) to be erased and is mounted to be slightly vertically above electromagnet 34 and to slide between electromagnets 34 and 56.

Tape tray 104 is supported vertically by a plurality of vertical rollers mounted on a carriage 110 to make rolling contact with the underside of rim 106, as exemplified by vertical roller 112. Tape tray 104 is constrained to rotate in a horizontal plane on carriage 110 by a plurality of horizontal rollers mounted on carriage 110 to make rolling contact with the outside periphery of rim 106, as exemplified by horizontal rollers 114 and 116.

Tape tray 104 has an annular slot 116 in the outside periphery of rim 106 to accomodate a V-belt 118 which serves to impart rotation to tape tray 104. Electric motor 120 is connected to drive V-belt 118 and thus rotate tape tray 104. This method of edge-driving tape tray 104 by a V-belt 118 is particularly advantageous in the operation of de-gausser 20 since no drive components need come between electromagnets 34 and 56 to reduce the magnetic field therebetween, and electromagnets 34 and 56 are allowed to closely, physically approach the recording tape (not shown) to be degaussed so as to insure complete and effective magnetic erasure.

Carriage 110 is mounted for sliding horizontal movement with respect to base plate casting 24 by carriage roller 120 which is secured to carriage 110 and which makes rolling contact with track 122 on base plate casting 24. Carriage 110 is also supported by bearing plate 124 which is secured to carriage 110 and which makes sliding contact with the upper surface of rack 126. Rack 126 is attached to and extends along the length of base plate casting 24 and serves to confine carriage 110 to unidirectional horizontal movement. Tape tray 104 is carried along in horizontal motion by carriage 110.

Pinion gear 128 meshes with rack 126 and is connected through slip clutch 130 and drive train 132 to electric motor 120. As pinion gear 128 is rotated, carriage 110 is caused to translate horizontally along rack 126. Motor 120, slip clutch 130, drive train 132, and pinion gear 128 are all mounted on carriage 110 and thus move with carriage 110 as it horizontally translates. Therefore, the rotation of motor 120 causes both rotation of tape tray 104 and horizontal translation of tape tray 104.

A tape height sensor pivoting flap 136 is pivotably mounted on support bracket 82 in front of photoreflective sensor 134 to detect when upper electromagnet 56 is physically positioned too low. Pivoting flap 136 hangs vertically below upper electromagnet 56 so as to physically contact a recording tape container (not shown) placed on tape tray 104; when the recording tape container is too large to fit underneath upper electromagnet 56. The function of photo-reflective sensor 134 is to detect movement of flap 136 caused by contact with a recording tape container (not shown). When photoreflective sensor 134 detects movement of flap 136, then motion of the recording tape container (not shown) towards upper electromagnet 56 is prevented and physical damage to upper electromagnet 56 and/or the recording tape container is avoided.

Referring next to FIG. 3, drive pulley 135 is mounted on motor 120 to drive V-belt 118 and rotate tape tray 104. Tape tension pully 137 is mounted on carriage 110, contacts V-belt 118, and is adjustable to maintain tension in V-belt 118. Front microswitch 138 is mounted on base plate casting 24 to make contact with and sense when carriage 110 has slid horizontally to its full forward position. Rear microswitch 140 is mounted on base plate casting 24 to make contact with and sense when carriage 110 has slid horizontally to its full rearward position.

Clutch 130 slips when carriage 110 is in its full rearward position and tape tray 104 is between electromagnets 34 and 56 so that tape tray 104 is allowed to rotate while remaining in the same horizontal position. It is important that tape tray 104 be allowed to rotate while in place between electromagnets 34 and 56 so that magnetic recording tape (not shown) in tape tray 104 is fully exposed to the erasing magnetic flux between electromagnets 34 and 56.

Pivoting flap 136 is positioned below and in front of upper electromagnet 56 so as to come into contact with tape containers (not shown) on tape tray 104 before such containers make contact with the upper electromagnet 56. As described above, pivoting flap 136 functions as a tape height sensor to prevent destructive contact between a tape container (not shown) and the upper electromagnet 56.

Link 142 is similar in shape to link 78 and is pivotably mounted to upper electromagnet 56 on the side opposite link 78. Link arm 80 extends around upper electromagnet 56 and forms a parallelogram linkage with link 142 to pivotably support upper electromagnet 56 on upper housing 84. A pair of springs 144 and 146 similar to springs 100 and 102 are mounted adjacent link 142 to perform the same counter balancing function performed by springs 100 and 102.

Cover detector microswitch 148 is mounted on cover shroud 22 to detect when tray cover 30 (see FIG. 1) is in place. In order to protect the user of de-gausser 20 from physical injury, it is desireable to prevent de-gausser 20 from operating when cover 30 is not in place so that the user's hands don't become entangled with the moving tape tray 104.

Figure 4:
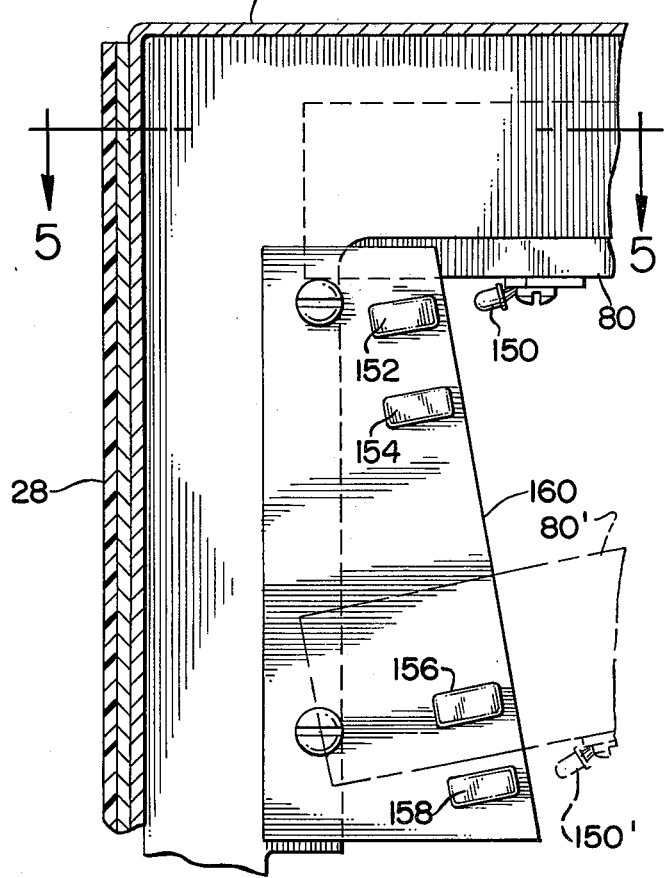
FIG. 4 is a partially cut-away side sectional view of a portion of the magnetic tape de-gausser of this invention showing the standard magnet separation circuit board and light source, and further showing, in phantom, a lowered position of the parallelogram linkage.

Referring next to FIG. 4, standard magnet separation light source 150 is preferably a light emitting diode attached to link arm 80 and which moves up and down vertically with link arm 80. Light source 150 is shown in a lowered position 150' corresponding to the lowered position 80' of link arm 80 as described in connection with FIG. 2 herein. Light source 150 is positioned to project light into successive light sensors 152, 154, 156, and 158 as link arm 80 is moved up and down. Light sensors 152, 154, 156 and 158 are preferably light sensitive resistors mounted on standard magnet separation circuit board 160 in order to intercept light projected by light source 150. Circuit board 160 is securely mounted on upper housing 84 and light sensors 152, 154, 156, and 158 are stationary with respect to upper housing 84.

The function of light sensors 152, 154, 156 and 158 is to cooperate with light source 150 to detect the vertical position of upper electromagnet 56 by detecting the position of link arm 80. Light sensors 152, 154, 156 and 158 serve to detect when upper electromagnet 56 is at predefined "standard" vertical positions corresponding to standard sizes of magnetic tape containers (not shown) to be placed in de-gausser 20, and a "standard" position of electromagnet 56 is detected when light source 150 shines directly into one of the light sensors 152, 154, 156 or 158. For example, the vertical position of upper electromagnet 56 appropriate for erasing magnetic tape on one half-inch videocassettes may be detected by sensor 158, on three quarter-inch videocassettes by sensor 156, on two inch reels by sensor 154, and on two inch video cassettes by sensor 152. Light source 150 and sensors 152, 154, 156, and 158 perform the function of allowing the user of degausser 20 to know when crank knob 26 (see FIG. 1) has been properly adjusted so as to attain a separation between electromagnets 34 and 56 appropriate to a particular size magnetic tape container (not shown) to be placed on tape tray 104, and to insure that effective erasing occurs by placing upper electromagnet 56 in close proximity to the tape container and also to insure that the tape container does not physically contact the upper electromagnet 56 or the pivoting flap 136.

Figure 5:
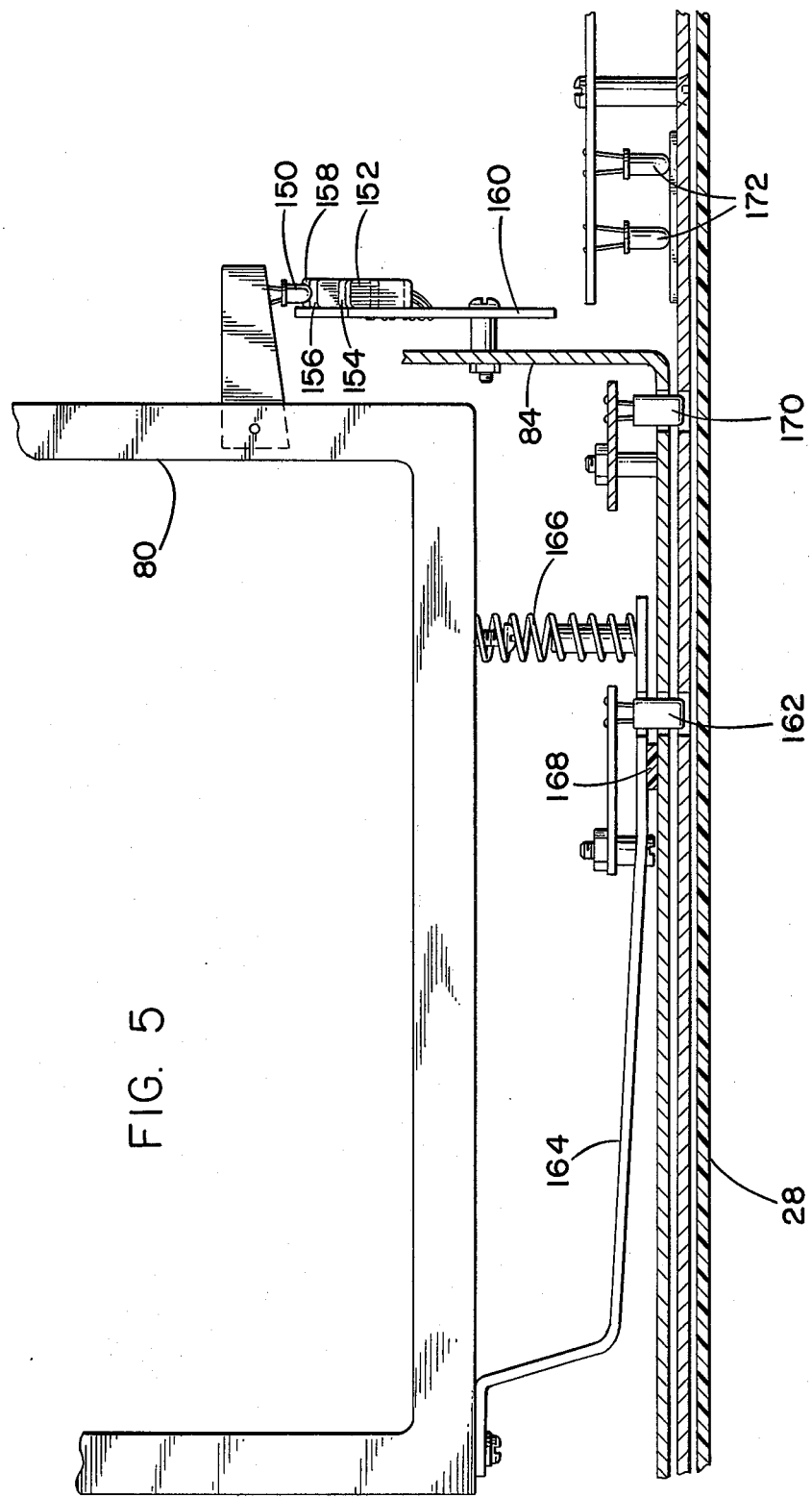
FIG. 5 is a partially cut-away top sectional view of a portion of the magnetic tape de-gausser of FIG. 4 taken along the line 5—5 thereof.

Referring next to FIG. 5, magnet height indicator light source 162 preferably is a light emitting diode and is mounted on support strap 164 which is spring cantilevered from link arm 80. Compression coil spring 166 is mounted between strap 164 and link arm 80 so that strap 164 makes continuous contact with and slides along contact strip 168 mounted inside upper housing 84. The purpose of light source 162 is to shine through panel 28 and give a continuous indication of the vertical position of upper electromagnet 56 and link arm 80. Light source 162 moves up and down vertically in response to the vertical movement of upper electromagnet 56 and link arm 80. The function of strap 164 and spring 166 is to hold light source 162 physically close to panel 28 as link arm 80 is horizontally displaced due to vertical movement of link arm 80 by springbiasing source 162 towards panel 28. It is desireable that light source 162 be maintained physically close to panel 28 so that light emitted by light source 162 is clearly visible to the user of degausser 20 and so that the vertical position of upper electromagnet 56 may be readily determined by observing panel 28.

The vertical position of light source 162 may be used to decide how to manually adjust crank knob 26 to achieve a desired vertical position for upper electromagnet 56. Also, the vertical position of light source 162 may be used to determine when crank knob 26 has been properly adjusted so that upper electromagnet 56 has been vertically positioned to accomodate a tape container having a size not corresponding to the "standard" sizes detected by light sensors 152, 154, 156, or 158.

Light sources 170 are preferably light emitting diodes and are positioned behind panel 28 so as to project light through panel 28. Sources 170 consist of four light sources associated with sensors 152, 154, 156, and 158 and arranged in a vertical row to light in response to the detection of light from light source 150 by the corresponding sensor 152, 154, 156 or 158. The function of light sources 170 is to provide a visual indication to the user of degausser 20 to signal when crank knob 26 has been properly adjusted so as to place upper electromagnet 56 at a "standard" vertical position.

Light sources 172 are preferably light emitting diodes positioned behind panel 28 to shine through panel 28 to display printed next on panel 28 and thereby to communicate to the user of degausser 20 information concerning the status thereof.

Referring next to FIG. 6, tape tray 104 is provided with a removable hub 174 and separator bars 176, 178, and 180 which are removably mounted to bottom disk 108 by means of mounting screw 182 which threads into disk 108. The function of separator bars 176, 178, and 180 is to prevent magnetic tape cassettes (not shown) and small tape reels (not shown) from moving around on the surface of disk 108 when degausser 20 is operated, thus insuring that the tape on such cassettes and reels is completely and uniformly erased. The function of hub 174 is to hold bars 176, 178, and 180 down in place when such bars are needed, and to allow the bars to be removed from disk 108 when not needed.

Horizontal rollers 114, 116, 184, 186, and 190 are horizontally mounted on carriage 110 and make rolling contact with the outside periphery of the tape tray 104, thus allowing tape tray 104 to rotate but preventing tape tray 104 from translating horizontally on carriage 110.

Vertical rollers 112, 192, 194, 196, and 198 are vertically mounted on carriage 110 and make rolling contact with the underside of tape tray 104 near the periphery thereof, thus providing vertical support for tape tray 104 and allowing tape tray 104 to rotate.

Lower electromagnet 34 is positioned to lie in the path of tape tray 104 as tray 104 and carriage 110 move horizontally on rack 126 and track 122. As tape tray 104 rotates and passes over lower electromagnet 34, magnetic flux emanating from pole pieces 42, 44, and 38 sweeps over the area encompassed by disk 108.

Figure 7:
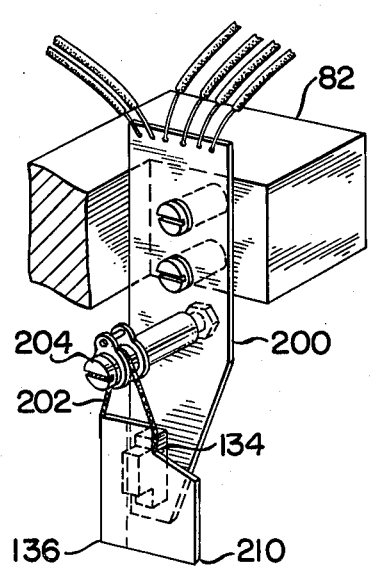
FIG. 7 is a partially cut-away side perspective view of a portion of the parallelogram linkage of this invention showing the tape height sensor mounted thereon.

Referring next to FIG. 7, photoreflective sensor 134 is mounted on tape height sensor circuit board 200 which which is attached to support bracket 82. Photoreflective sensor 134 preferably comprises a light emitting diode and photo-darlington transistor light receiver combined together in a commercially available component part, and which senses the optical reflectance of items placed in front of sensor 134.

Pivoting flap 136 is placed in front of sensor 134 and is attached to circuit board 200 by means of a flexible length of string 202 which is looped over a post 204 attached to circuit board 200. String 202 allows flap 136 to pivot and move freely upwards and in all horizontal directions. It is desireable that flap 136 be capable of free upwards and horizontal movement since, because of the rotation of tape tray 104, a magnetic tape container (not shown) placed on tape tray 104 may approach and contact flap 136 from differing directions which are related to the relative position of the tape container on the disk 108. It is desireable that flap 136 not be physically damaged by contact with a magnetic tape container (not shown).

Figure 8:
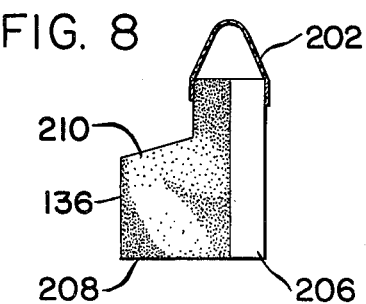
FIG. 8 is a side view of the tape height sensor pivoting flap of this invention.

Referring next to FIG. 8, the side of flap 136 which faces photoreflective sensor 134 has a white colored stripe 206 placed vertically down one end thereof. The remaining area 208 of flap 136 is colored black to have a low optical reflectivity. The stripe 206 has a high optical reflectivity. When flap 136 is placed in front of sensor 134, stripe 206 is positioned in front of sensor 134 unless a magnetic tape container (not shown) contacts flap 136 so as to place area 208 in front of sensor 134, or so as to move stripe 206 from the front of sensor 134 and change the optical reflectance presented to sensor 134. Thus, a magnetic tape container (not shown) striking flap 136 causes a change in optical reflectance which is detected by sensor 134.

Flap 136 is equipped with a forwardly protruding lobe 210 which protrudes in front of circuit board 200 and upper electromagnet 56 to insure that magnetic tape containers (not shown) will strike flap 136 and be detected by sensor 134 prior to striking upper electromagnet 56 and causing physical damage.

Figure 9:
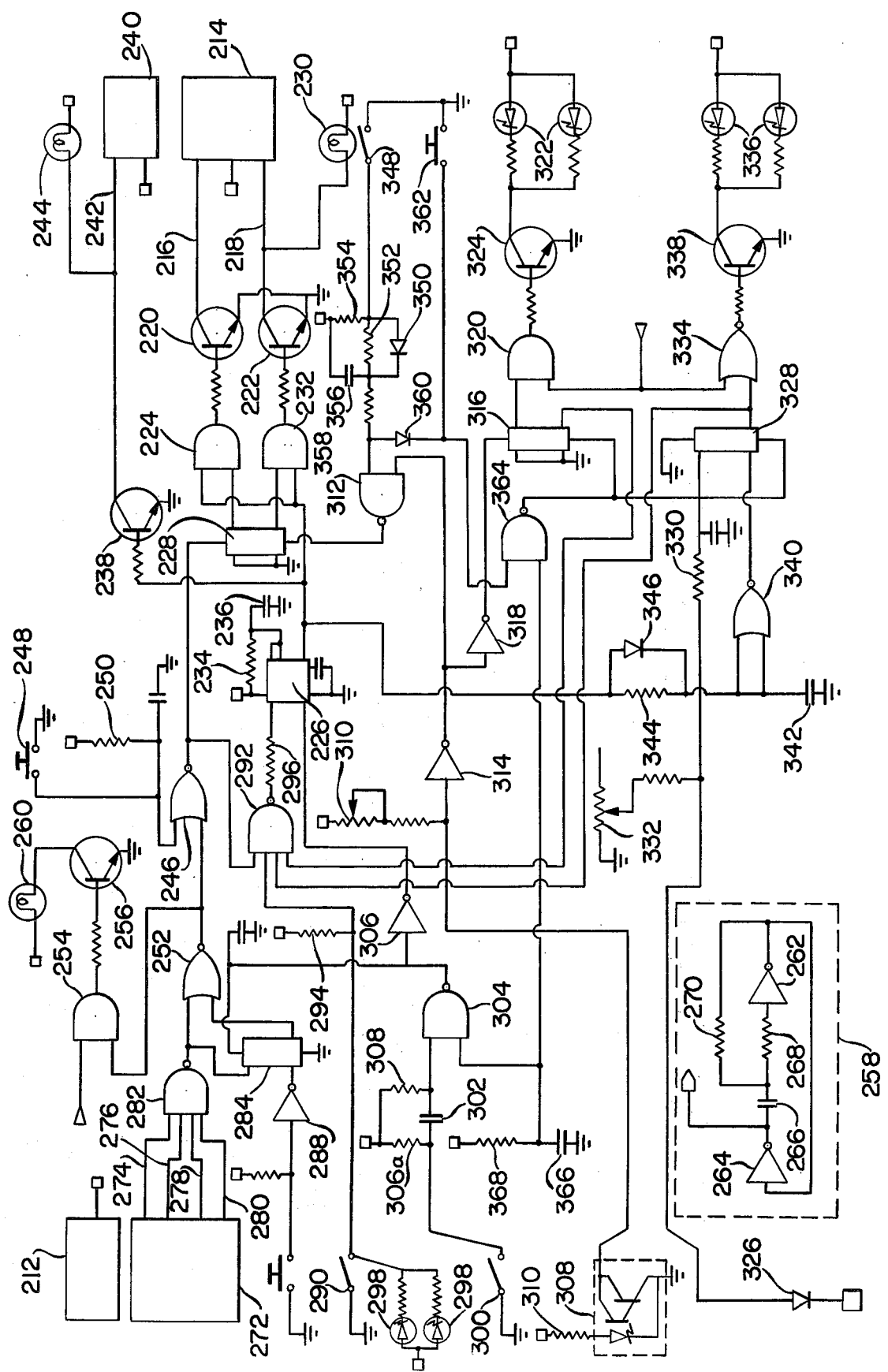
FIG. 9 is an electrical schematic circuit diagram of the logic portions of the electronic circuitry of this invention.

Referring next to FIG. 9, power supply 212 provides direct current power to all circuit nodes in FIGS. 9, 10, 11, and 12 which are marked with a small open square. Supply 212 preferably provides a positive twelve volt power for the operation of the logic integrated circuit gates, timers, and flip-flops.

Tray translation and rotation control circuit 214 is connected by leads 216 and 218 to the collectors of transistors 220 and 222, respectively. When transistor 220 is turned "On", motor 120 is activated so that tape tray 104 rotates and moves towards electromagnets 34 and 56. When transistor 222 is "On", motor 120 is activated so that tape tray 104 rotates and moves away from electromagnets 34 and 56, and lamp 230 lights to indicate on panel 28 that the tray 104 is moving in a reverse direction.

AND gate 224 has its output connected through a resistor to the base of transistor 220, one input connected to the output of timer 226, and another input connected to the non-inverted output of flip-flop 228. AND gate 232 has its output connected through a resistor to the base of transistor 222, one input connected to the output of timer 226, and another input connected to the inverted output of flip-flop 228. When AND gate 224 is "On" then transistor 220 is turned "On", and when AND gate 232 is "On" then transistor 222 is turned "On". Flip-flop 228 prevents both gates 224 and 232 from being "On" at the same time and acts to select which of gates 224 or 232 is allowed to turn "On".

Timer 226 is preferably a commercially available, general purpose timer integrated circuit of the type denoted LM555, and which is connected to resistor 234 and capacitor 236 to act as a monostable latch having a time period of approximately fifty seconds. The output of timer 226 is connected through a resistor to the base of transistor 238 so that when timer 226 is "On", transistor 238 is turned "On", and electromagnet drive circuit 240 is activated through lead 242 connected to the collector of transistor 238 to provide electromagnets 34 and 56 with electrical power. Lamp 244 is connected to the collector of transistor 238 and is caused to light when transistor 238 turns "On" thus indicating visually on panel 28 that electromagnets 34 and 56 are supplied with electrical power.

Timer 226 functions to turn the electromagnets 34 and 56 on for a maximum of approximately fifty seconds and to allow motor 120 to run for a maximum of fifty seconds thus providing a safeguard timer circuit to shut down the operation of degausser 20 if too much time elapses (more than approximately fifty seconds) during the tape erasing operating cycle as when a tape reel (not shown) becomes physically stuck between the electromagnets 34 and 56 or when the degausser 20 malfunctions.

NOR gate 246 has its output connected to the set input of flip-flop 228 so that when gate 246 goes "On", gate 224 is not inhibited from going "On" and gate 232 is inhibited from going "On". Push button switch 248 is connected between one input of gate 246 and ground and, when depressed, serves as a "start" button and pulls down the input to gate 246 which is held high through resistor 250.

NOR gate 252 has its output connected to an input of gate 246 and also is connected to an input of AND gate 254. The output of gate 254 is connected through a resistor to the base of transistor 256. Blink source circuit 258 has its output connected to an input of gate 254. Lamp 260 is connected to the collector of transistor 256 so that lamp 260 lights when transistor 256 turns "On" thus indicating visually on panel 28 that the separation distance between electromagnets 34 and 56 is not a "standard" distance. Since one input to gate 254 is connected to the output of blink source circuit 258, lamp 260 will flash on and off when gate 252 is "On".

Blink source circuit 258 has an inverter 262 with its output connected to the input of another inverter 264. A capacitor 266 and a resistor 268 are connected in series with the capacitor 266 connected to the output of inverter 264 and the resistor 268 connected to the input of inverter 262. A resistor 270 is connected between the output of inverter 262 and the interconnection between resistor 268 and capacitor 266. An output signal for blink source circuit 258 occurs at the output of inverter 264 and which is a square wave for flashing indicator and warning lights at a rate of approximately two flashes per second. The output of blink source circuit 258 is connected to the circuit nodes shown in FIG. 9 with a small triangle.

The standard magnet separation detection system circuit 272 is connected by leads 274, 276, 278, and 280 to the inputs of NAND gate 282. NAND gate 282 is "off" unless the light sensors 152, 154, 156, or 158 (see FIG. 4) detect that the upper electromagnet 56 is at a "standard" vertical position. The output of gate 282 is connected to an input of NOR gate 252 and to the non-inverting input of flip-flop 284. A standard override switch 286 is connected through an inverter 288 to the inverting input of flip-flop 284 to allow operation of degausser 20 on a manual override basis at the option of the user when upper electromagnet 56 is not at a "standard" vertical position. In practice, the flashing of lamp 260 indicates to the user of degausser 20 that the upper electromagnet 56 is not at a "standard" vertical position and that switch 286 must be depressed in order to cause tray 104 to move and the electromagnets 34 and 56 to generate an erasing magnetic field. Switch 286 represents a push button switch mounted on panel 28.

Lid safety switch 290 is connected to pull down an input to NAND gate 292 which is connected through a resistor 294. Switch 290 corresponds to switch 148 in FIG. 3 and serves to prevent operation of degausser 20 when the cover 30 is not in place. NAND gate 292 has its output connected through resistor 296 to control the initiation of timer 226. Switch 290 is connected to close when the cover 30 is not in place and thus acts to turn on the light emitting diodes 298 corresponding to two of the light sources 172 on panel 28 and to indicate to the operator of degausser 20 that the cover 30 must be mounted.

Gate 292 has an input connected to the output of gate 246. The function of gate 292 is to trigger timer 226 when all of the inputs to gate 292 are "on" and when the output of gate 246 has momentarily gone "on".

Stop switch 300 is connected through capacitor 302 to an input of NAND gate 304. Resistors 306 and 308 are connected between power supply 212 and opposite sides of capacitor 302 so that gate 304 is caused to momentarily go "on" when switch 300 closes. Switch 300 corresponds to the switch 138 shown in FIG. 3 and serves to stop movement of tape tray 104 when tray 104 reaches its full forward travel out from between electromagnets 34 and 56. The output of gate 304 is connected to the set input of flip-flop 284 and is connected through inverter 306 to the reset input of timer 226. Since the inverted output of flip-flop 284 is connected to an input of gate 252, flip-flop 284 allows switch 286 to permit operation of degausser 20 when upper electromagnet 56 is not at a standard vertical position, and switch 300 acts to reset the flip-flop 284 at each time that tray 104 has completed its sliding cycle so that the standard circuit 272 will be checked again by gate 282.

Photo-reflective sensor 308 is connected through resistor 310 to power supply 212 and corresponds to sensor 134 shown in FIG. 7. Sensor 308 is preferably the commercially available type of component consisting of a light emitting diode mounted alongside a photo-darlington transistor so that optically reflective objects placed in front of sensor 308 will cause light from the light emitting diode to be reflected onto the photo-darlington transistor in accordance with the optical reflectivity of the object. The output of sensor 308 is connected to the power supply 212 through a resistor 310, the resistor 310 being variable to allow the sensitivity of sensor 308 to be adjusted.

The output of sensor 308 is connected to an input of NAND gate 312 through an inverter 314. The output of NAND gate 312 is connected to the reset input of flip-flop 228. Thus, a reflection change detected by sensor 308 will cause motor control circuit 214 to be activated so that tray 104 is pulled away from between electromagnets 34 and 56. The output of inverter 314 is connected to the set input of flip-flop 316 through an inverter 318. AND gate 320 has its inputs connected to the non-inverted output of flip-flop 316 and to the output of blink source circuit 258; so that light emitting diodes 322 will be activated through transistor 324 to flash after sensor 308 had detected a change in reflectance. Diodes 322 correspond to two of the light sources 172 on panel 28 and serve to indicate to the user of degausser 20 that a magnetic tape container (not shown) has struck pivoting flap 136 (see FIG. 3) and therefore that upper electromagnet 56 is positioned too low.

The inverted output of flip-flop 316 is connected to an input of gate 292 so that timer 226 is inhibited from being activated after sensor 308 has detected a change in reflectance.

Temperature sensing diode 326 has its cathode connected to power supply 212 and its anode connected to the non-inverting input of flip-flop 328 through a resistor 330. The anode of diode 326 is connected to ground through an adjustable resistor 332 which is adjustable to allow the temperature sensitivity of diode 326 to be varied. Diode 326 is of the commercially available type which breaks down and allows reverse current flow at elevated temperatures. Diode 326 represents a diode which is to be mounted in physical contact with the core 40 of lower electromagnet 34. The function of diode 326 is to monitor the temperature of core 40 so that operation of degausser 20 can be electrically prevented when electromagnet 34 is overheated. Thus, diode 326 provides an overheating detection safety feature to protect degausser 20 from damage.

NOR gate 334 has its inputs connected to the inverted output of flip-flop 328 and to the output of blink source circuit 258; so that light emitting diodes 336 will be activated through transistor 338 to flash after diode 326 has detected that the core 40 is too hot. Diodes 336 correspond to two of the light sources 172 on panel 28 and serve to indicate to the user of degausser 20 that degausser 20 is overheated and must be allowed to cool off before use. The inverted output of flip-flop 328 is also connected to an input of gate 292 to inhibit the starting of timer 226 when core 40 is overheated. Thus, overheating of diode 326 will inhibit the initiation of a demagnitizing cycle of degausser 20 but will not stop degausser 20 once a cycle has started.

NOR gate 340 has its output connected to the inverting input of flip-flop 328 and has its inputs connected together through capacitor 342 to ground. The inputs of gate 340 are also connected through a parallel resistor 344 and diode 346 to the output of timer 226. The function of gate 340 is to make flip-flop 328 insensitive to the condition of diode 326 for a period of time after timer 226 has shut "off". This time period is determined by the size of resistor 344 and capacitor 342, and insures that the condition of diode 326 is not affected by magnetic fields from electromagnets 34 and 56 which cease after timer 226 shuts "off".

Switch 348 corresponds to switch 140 (see FIG. 3) and is connected between ground and the anode of diode 350. Resistor 352 is connected in parallel with diode 350. Resistor 354 is connected between the anode of diode 350 and power supply 212. Capacitor 356 is connected between the cathode of diode 350 and power supply 212. Resistor 358 connects the cathode of diode 350 to an input of gate 312 and the anode of diode 360. Push button switch 362 corresponds to a switch mounted on panel 28 and is connected between ground and the cathode of diode 360 which is connected to an input of NAND gate 364.

The function of gate 312 is to cause the motor control circuit 214 to be activated to pull tape tray 104 away from the electromagnets 34 and 56 when: the switch 348 senses that tray 104 and carriage 110 are fully between the electromagnets 34 and 56, or the switch 362 has been depressed by the operator of degausser 20 to reverse the motion of tape tray 104, or sensor 308 has detected that a magnetic tape container (not shown) is vertically too high and risks making damaging contact with upper electromagnet 56.

The function of capacitor 356 and resistor 352 is to provide a time delay soaking period between the time that switch 348 senses that tray 104 is between electromagnets 34 and 56, and the time that gate 312 changes state to cause tray 104 to be pulled away from the electromagnets 34 and 56. This soaking period is important to insure that magnetic tapes (not shown) on tray 104 are completely and uniformly erased by maintaining tray 104 between electromagnets 34 and 56 for a period of time while tray 104 is rotating. It is preferable to insure that the sizes of capacitor 356 and resistor 352 are chosen so that the tray 104 makes approximately one and one-half revolutions when tray 104 is between electromagnets 34 and 56 and switch 140 is contacted by carriage 110. The tray 104 should preferably make a non-whole number of revolutions while stopped from moving horizontally when between electromagnets 34 and 56 so that non-uniformities in magnetic erasing do not result.

The output of gate 364 is connected to the reset inputs of flip-flops 316 and 328. Flip-flops 316 and 328 are reset by gate 364 when push-button 362 is depressed or when power supply 212 has become active and capacitor 366 has not had time to charge up. Capacitor 366 is connected between ground and inputs to gates 304 and 364. Resistor 368 is connected between power supply 212 and capacitor 366. Gate 304 serves to set flip-flop 284 and reset timer 226 when power supply 212 has become active and capacitor 366 has not had time to charge up.

Figure 10:
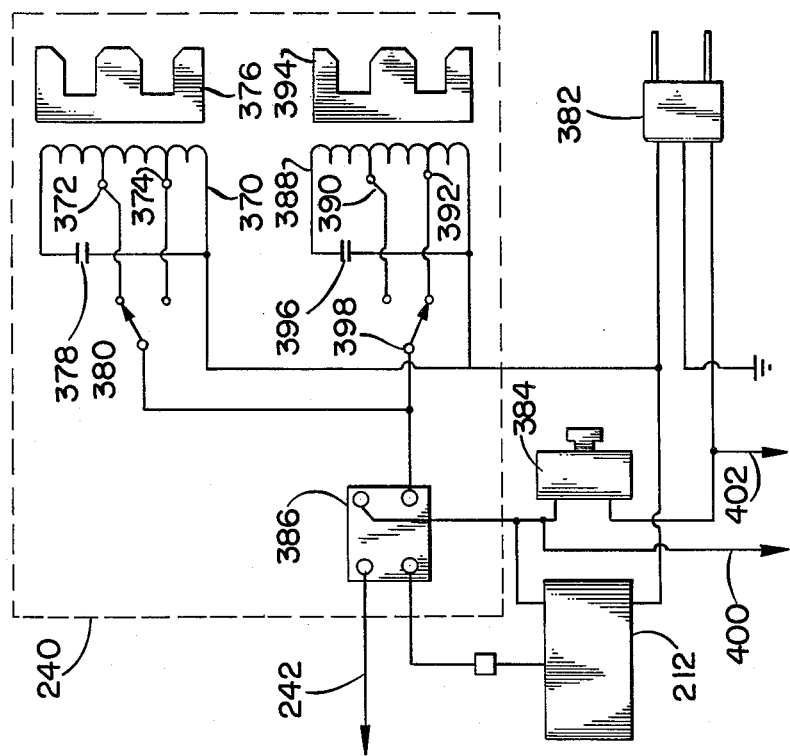
FIG. 10 is an electrical schematic circuit diagram of the electromagnet drive circuitry of this invention.

Referring next to FIG. 10, electromagnet drive circuit 240 has an upper winding 370 with taps 372 and 374. Winding 370 corresponds to upper electromagnet winding coil 76 (see FIG. 2). core 376 is magnetically coupled to winding 370 and corresponds to upper electromagnet core 58 (see FIG. 2). Capacitor 378 is connected across winding 370 to form an inductance-capacitance tank circuit which is approximately resonant at the frequency of the electrical power applied (preferably sixty Hertz). The function of the capacitor 378 is to minimize the electrical power required to drive the winding 370 and to allow winding 370 to "ring" in a damped electrical oscillation when drive power is discontinued so as to promote uniform, efficient tape erasure. When winding 370 "rings", core 376 produces a damped magnetic oscillation which insures that no large discontinuities, glitches, or spikes are produced in magnetic tapes being erased by degausser 20.

Switch 380 is connected to the power plug 382 through a circuit breaker 384 and an optically coupled, solid-state relay 386. The function of switch 380 is to select between center taps 372 and 374 so as to select the amount of magnetic power produced in core 376. The center taps 372 and 374 allow the winding 370 to behave as an auto-transformer so as to minimize the voltage level required to drive the winding 370 and produce a large voltage across capacitor 378.

Winding 388 is similar to winding 370, has center taps 390 and 392, and corresponds to lower electromagnet coil winding 36. Core 394 is similar to core 376, is magnetically coupled to winding 388, and corresponds to lower electromagnet core 40. Capacitor 396 is similar to capacitor 378 and is connected across winding 388. Switch 398 is similar to switch 380 and is connected to relay 386 to select between taps 390 and 392. Core 394, winding 388, capacitor 396 and switch 398 function and cooperate together in the same way as core 376, winding 370, capacitor 378, and switch 380.

It is desirable that the power flowing through windings 370 and 388 be separately adjustable through switches 380 and 398 so that magnetic tape containers (not shown) having magnetic parts, such as tape reels having metal hubs, can be conveniently processed by placing switch 398 to the high power tap 392 and by placing switch 380 to the lower power tap 372 so that the magnetic tape container (not shown) is held against disk 108 and is prevented from flying upwards to destructively contact upper electromagnet 56.

Relay 386 is controlled by lead 242 to connect switches 380 and 398 with the power plug 382 through circuit breaker 384. Power plug 382 is to be connected to a standard wall socket source of alternating current power. Power supply 212 is also supplied with power through plug 382 and circuit breaker 384. Leads 400 and 402 are a source of alternating current electrical power protected by circuit breaker 384.

Figure 11:
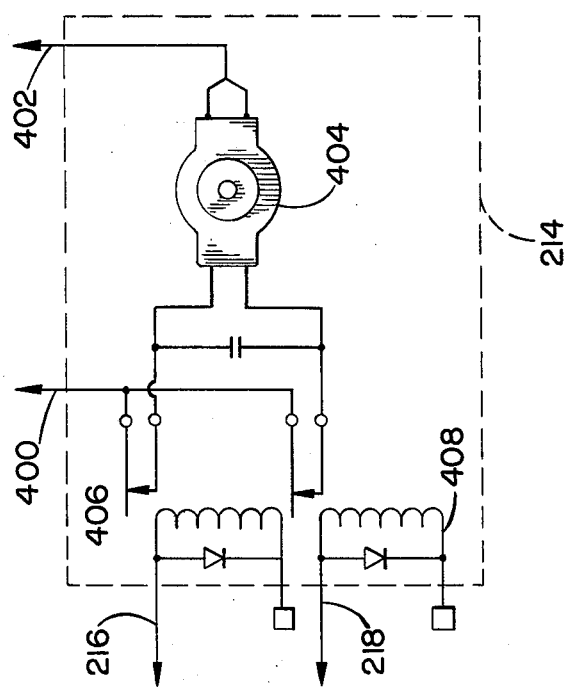
FIG. 11 is an electrical schematic circuit diagram of the tray rotation and translation control circuitry of this invention.

Referring next to FIG. 11, motor 404 is an alternating current, reversible electric motor corresponding to the motor 120 shown in FIG. 2. Motor 404 has a common winding connection made to power lead 402 and has directional winding lead connections make through electromagnetic relays 406 and 408 to power lead 400.

Leads 216 and 218 control the activation of relays 406 and 408, respectively, so as to control the direction of rotation of motor 404.

Figure 12:
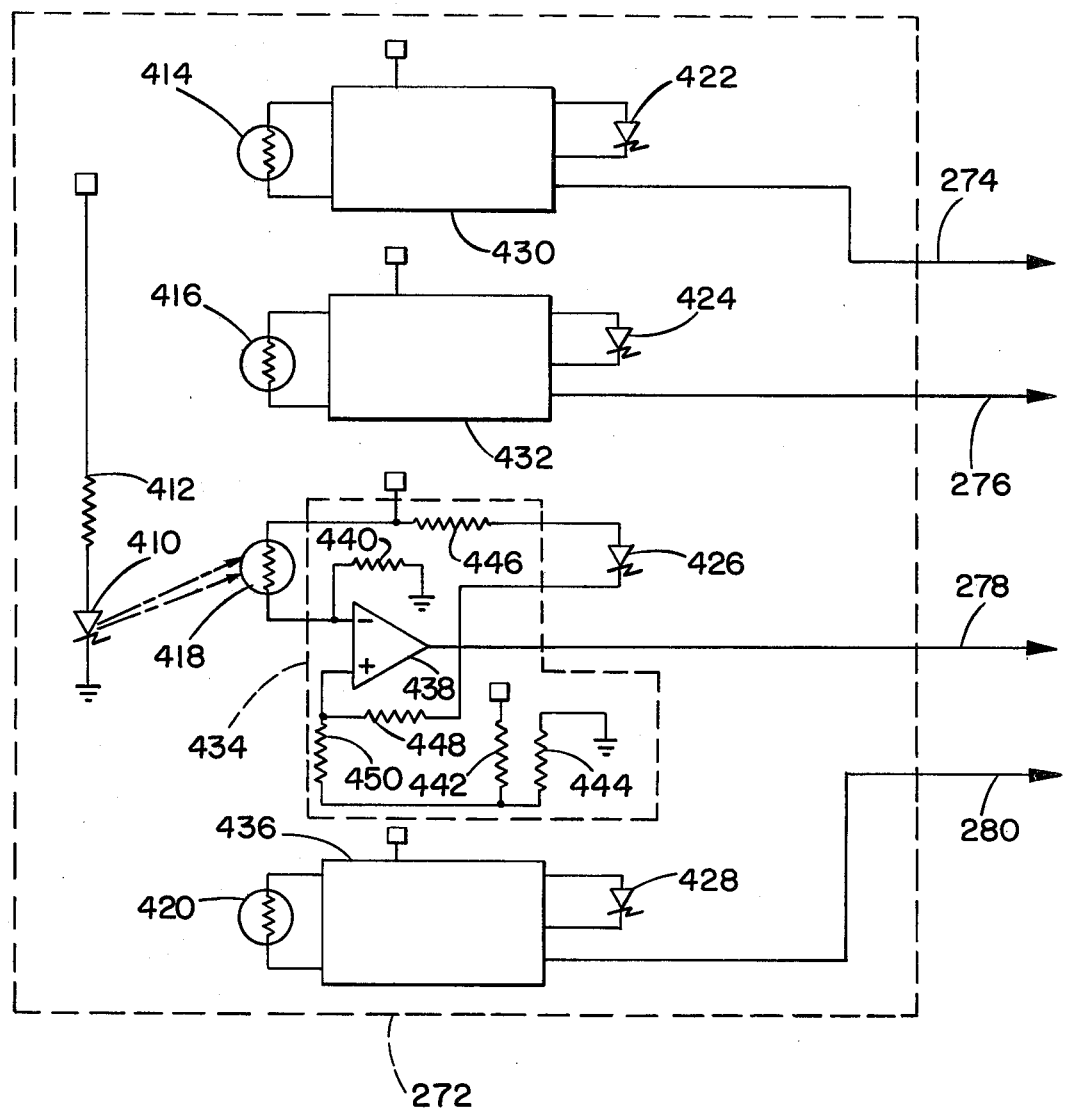
FIG. 12 is an electrical schematic circuit diagram of the standard magnet separation detection circuitry of this invention.

Referring next to FIG. 12, light emitting diode 410 is connected between ground and the power supply 212 through resistor 412. Diode 410 corresponds to the light source 150 shown in FIG. 4. Light sensitive resistors 414, 416, 418, and 420 correspond to the light sensors 152, 154, 156, and 158, respectively, shown in FIG. 4. Light emitting diodes 422, 424, 426, and 428 correspond to light sources 170 (see FIG. 5).

Detection circuitry 434 has the same construction as and is functionally similar to detection circuitry 430, 432, and 436. Circuitry 434 is connected to resistor 418 to sense when light falls on resistor 418, and to produce an output on lead 278 and light diode 426 when light falls on resistor 418. Integrated circuit comparator 438 is connected to compare the voltage across resistors 418 and 440 with the voltage across resistors 442 and 444. When light is detected by resistor 418, comparator 438 turns "off" so that diode 426 is lit by power through resistor 446, and so that the voltage on lead 278 decreases. The function of resistors 448 and 450 is to set the gain of comparator 438.

Circuitry 430 is connected to resistor 414 and controls the voltage on lead 274 and the lighting of diode 422. Circuitry 432 is connected to resistor 416 and controls the voltage on lead 276 and the lighting of diode 424. Circuitry 436 is connected to resistor 420 and controls the voltage on lead 280 and the lighting of diode 428.

What is claimed is:

1. A magnetic tape de-gausser for erasing information encoded on a magnetic tape encased in a magnetic tape container, said de-gausser comprising:

a base having a first electromagnet mounted therein for generating magnetic flux for erasing said magnetic tape;

a tray slidably mounted on said base for conveying said magnetic tape container towards and away from said lower electromagnet;

a second electromagnet for generating magnetic flux for erasng said magnetic tape; and means for adjustably mounting said second electromagnet on said base so that said tray slides between said first and second electromagnets and so that the distance between said first and second electromagnets adjusts to tightly accommodate said tray and said magnetic tape container.

2. The magnetic tape de-gausser of claim 1 wherein said means for mounting said second electromagnet comprises:

a parallelogram linkage having first and second links mechanically connected between said base and said second electromagnet; and means for operatively connecting said first link and said base to cause said first link to pivot and displace said second electromagnet so that the distance between said first and second electromagnets is adjusted.

3. The magnetic tape de-gausser of claim 2 wherein said means for connecting said first link comprises:

a crank knob rotatably mounted on said base for manual manipulation by the user of said de-gausser;

a universal joint coupled to said crank knob for transferring the rotations thereof; and a lead screw threadably mounted in said first link to cause said first link to pivot and displace said second electromagnet when said leadscrew is rotated by said crank knob acting through said universal joint.

4. The magnetic tape de-gausser of claim 1 further including a standard magnet separation detector connected between said second electromagnet and said base to detect when said second electromagnet has been adjusted to tightly accommodate a plurality of different predetermined sizes of said magnetic tape containers.

5. The magnetic tape de-gausser of claim 4 wherein said standard magnet separation detector comprises:

a transmitter source coupled to said second electromagnet so as to physically move in response to displacement of said second electromagnet;

a plurality of receiver sensors mounted on said base and positioned to detect said transmitter source when said second electromagnet has been adjusted to tightly accommodate a corresponding plurality of different predetermined sizes of said magnetic tape containers.

6. The magnetic tape de-gausser of claim 5 wherein said transmitter source comprises an optical light source, and said receiver sensors comprise light sensors arranged to intercept and detect light produced by said light source.

7. The magnetic tape de-gausser of claim 1 further comprising tray translation and rotation means for automatically rotating said tray and for automatically, slidably translating said tray towards and away from said first and second electromagnets.

8. The magnetic tape de-gausser of claim 7 wherein said tray is a round, thin disk having a rim therearound; and wherein said tray translation and rotation means comprises a motor, and a belt driven by said motor and extending around said rim to rotate said tray.

9. The magnetic tape de-gausser of claim 8 wherein said tray translation and rotation means further comprises:

a rack gear slidably supporting said tray; and
a gearbox connecting said motor and said rack gear so that as said motor rotates, said tray rotates and translates along said rack gear.

10. The magnetic tape de-gausser of claim 9 wherein said gearbox comprises a slip clutch between said rack gear and said motor so that said tray is allowed to rotate without translating.

11. The magnetic tape de-gausser of claim 7 further comprising a means for detecting when the clearance between said second electromagnet and said magnetic tape container is not adequate to allow said magnetic tape container to fit between said first and second electromagnets.

12. The magnetic tape de-gausser of claim 11 wherein said means for detecting comprises:
a pivoting flap coupled to said second electromagnet for contacting said magnetic tape container when the clearance between said magnetic tape container and said second electromagnet is not adequate, and having areas of contrasting optical reflectivity; and
a photoreflective sensor positioned adjacent to said pivoting flap to detect movement of said flap by sensing shifts in said areas of contrasting optical reflectivity.

13. The magnetic tape de-gausser of claim 1 wherein said first and second electromagnets each comprise an "E" shaped magnet core having notches placed in the opposing upper edges of the pole pieces thereof so as to concentrate the magnetic field and so as to increase the magnetic flux extending outwards from said pole pieces.

14. The magnetic tape de-gausser of claim 13 wherein said first and second electromagnets are mounted to face each other so that magnetic flux is enhanced between said first and second electromagnets.

15. The magnetic tape de-gausser of claim 7 further comprising separator bars removably mounted on said tray to retard said magnetic tape container from moving with respect to said tray.

16. The magnetic tape de-gausser of claim 1 wherein said first and second electromagnets each comprise a coil winding having switch-selectable center taps so that the magnetic power produced by said electromagnets may be independently adjusted.

17. The magnetic tape de-gausser of claim 16 wherein said first and second electromagnets each comprise a coil winding havng at least one center tap and having a capacitor connected across said center tap so that said winding and said capacitor form a tank circuit which is approximately resonant.

18. The magnetic tape de-gausser of claim 1 further comprising an electromagnet overheating prevention circuit for preventing operation of said de-gausser when said electromagnets are overheated.

19. The magnetic tape de-gausser of claim 1 further comprising a safeguard timer circuit for terminating operation of said de-gausser when a predetermined time period has elapsed.

20. The magnetic tape de-gausser of claim 10 further comprising:
means for switching when said tray is between said electromagnets;
means for stopping said tray from translating past said electomagnets when said tray is between said electromagnets; and
means for reversing said motor to translate said tray away from said electromagnets after said means for switching is activated.

21. The magnetic tape de-gausser of claim 20 further comprising means for delaying connected to said means for reversing so that said tray rotates a non-whole number of revolutions after said means for switching is activated and before said means for reversing causes said motor to translate said tray away from said electromagnets.

22. A method of de-gaussing magnetic recording tapes contained in magnetic tape containers comprising the steps of:
automatically rotating and translating said magnetic tape container towards a pair of opposing electromagnets;
exposing said magnetic tape container to strong magnetic flux extending between said electomagnets, while said magnetic tape container is automatically rotated between said electromagnets;
withdrawing said magnetic tape container from between said electromagnets, while said magnetic tape container is automatically rotated, and while said magnetic flux between said electromagnets is maintained; and
discontinuing said magnetic flux between said electomagnets in a damped oscillation.

23. The method of claim 22, after said step of exposing said magnetic tape container to strong magnetic flux, the step of soaking said magnetic tape container with magnetic flux by automatically rotating said magnetic tape container for a non-whole number of revolutions while said magnetic tape container is between said electromagnets.

* * * * *